United States Patent [19]
Nakamura et al.

[11] Patent Number: 5,929,925
[45] Date of Patent: Jul. 27, 1999

[54] DISPLAY DEVICE FOR DISPLAYING IMAGES WITH DIFFERENT ASPECT RATIOS AND/OR POSITIONS

[75] Inventors: Moritaka Nakamura, Yamatotakada, Japan; Kouji Kumada; Yukihiro Nakahara, both of Tenri, Japan

[73] Assignee: Sharp Kabushiki Kaisha, Osaka, Japan

[21] Appl. No.: 08/779,032

[22] Filed: Jan. 6, 1997

[30] Foreign Application Priority Data

Jan. 26, 1996 [JP] Japan .................................. 8-012238
Nov. 28, 1996 [JP] Japan .................................. 8-318320

[51] Int. Cl.⁶ ............................................... H04N 5/46
[52] U.S. Cl. ........................... 348/556; 348/792; 345/100
[58] Field of Search .................................... 348/556, 445, 348/581, 790, 792; 345/55, 98, 99, 100, 103; H04N 5/46

[56] References Cited

U.S. PATENT DOCUMENTS 5,357,290 10/1994 Horibe .................................... 348/556
5,534,940 7/1996 Sato et al. .
5,657,034 8/1997 Yamazaki ............................... 348/556
5,748,175 5/1998 Shimada ................................. 348/556

FOREIGN PATENT DOCUMENTS 3-131182 6/1991 Japan .
5-276468 10/1993 Japan .
6-189231 7/1994 Japan .

*Primary Examiner*—Sherrie Hsia
*Attorney, Agent, or Firm*—Nixon & Vanderhye P.C.

[57] ABSTRACT

A matrix type display device capable of receiving more than one video signal, which displays an image based on a first video signal with a smaller aspect ratio than an aspect ratio of a screen in width by inputting a second video signal in sync with a first video signal to at least a part of column drivers corresponding to a remaining portion on the screen where the image based on the first video signal is not displayed, so that the processing of the first and second video signals is started at the same time and carried out at the same timing. Consequently, the present matrix type display device can readily display a natural image based on an input video signal with a smaller aspect ratio than the that of the screen.

23 Claims, 8 Drawing Sheets

DISPLAY DEVICE FOR DISPLAYING IMAGES WITH DIFFERENT ASPECT RATIOS AND/OR POSITIONS

FIELD OF THE INVENTION

The present invention relates to a matrix type display device capable of displaying an image based on a video signal with a given aspect ratio on its screen with a different aspect ratio.

BACKGROUND OF THE INVENTION

A conventional TV set has a screen with a standard aspect ratio of 4:3, whereas a TV set in recent years or in the next generation, known as an HDTV (High-Definition TV) or EDTV (Extended-Definition TV), adopts a wider screen with an aspect ratio of 16:9. Conventionally, an image based on a video signal with an aspect ratio of 4:3 is displayed on a screen with an aspect ratio of 16:9 by one of the following methods:

(1) the video signal is extended in a lateral direction (in width);

(2) some horizontal and vertical periodic pulses are skipped and delayed as is disclosed in Japanese Laid-Open Patent Application No. 276468/1993 (Tokukaihei No. 5-276468); and (3) the video signal and a clock signal are controlled in a complex manner, so that a predetermined graduation level is written into a margin on the screen where an image based on the video signal with an aspect ratio of 4:3 is not displayed during a horizontal blanking period by accelerating a cycle period of the clock signal as is disclosed in Japanese Laid-Open Patent Application No. 131182/1991 (Tokukaihei No. 3-131182).

However, when a matrix type display device, such as a liquid crystal display device, displays an image with an aspect ratio of 4:3 on its screen with a wider aspect ratio of 16:9 by any of the above methods, each causes a problem.

To be more specific, in the first method, a displayed image is unnatural, because the image is extended in width alone or the entire image is not displayed as the video signal for the top and bottom portions is omitted.

In the second method, the video signal must be controlled in a complex manner to skip one in every certain number of row and column lines of the video signal and delay horizontal and vertical periodic pulses.

Also in the third method, the video signal and clock signal must be controlled in a complex manner. Further, the third method demands high-performance column drivers which can operate at the timing of a clock signal with an accelerated cycle period.

SUMMARY OF THE INVENTION

It is therefore an object of the present invention to provide a matrix type display device which can readily display a natural image on its screen based on an input video signal with a smaller aspect ratio than an aspect ratio of the screen without manipulating the video signal and controlling the video signal and clock signal in a complex manner.

The above object is fulfilled by a matrix type display device capable of receiving more than one video signal, which is furnished with:

N (N: an arbitrary number not smaller than 2) column drivers, each column driver being connected to a plurality of column lines, each column driver outputting a signal based on an input video signal to the connected column lines separately to display an image based on the video signal on a screen; and a plurality of row drivers, each row driver being connected to a plurality of row lines to output a signal to the connected row lines separately, wherein, in response to an input of a first video signal having a smaller aspect ratio than an aspect ratio of the screen in width, a second video signal, which is in sync with the first video signal, is inputted to at least a part of the column drivers corresponding to a remaining portion on the screen where an image based on the first video signal is not displayed, whereby processing of the first and second video signals is started at a same time and carried out at a same timing.

According to the above arrangement, when the first video signal with a smaller aspect ratio than that of the screen in width is inputted, the second video signal in sync with the first video signal is inputted to the column drivers corresponding to the remaining portion on the screen. The phrase "the second video signal is in sync with the first video signal" means signals relating to timing signals of these two video signals, such as a start pulse and a timing clock, are all the same. In addition, the second video signal is inputted into the column drivers in such a manner that the processing of the same is started concurrently with the processing of the first video signal and carried out at the same timing. Thus, the screen starts to display an image based on the first video signal and an image based on the second video signal concurrently at the same display rate. Note that the second video signal can be a video signal of a solidly shaded image or an ordinary input video signal. Also, the image based on the first video signal can be displayed at the right, left, or center of the screen.

The above arrangement enables the present matrix type display device to display a natural image based on an input video signal with a smaller aspect ratio than that of the screen without manipulating the video signal and controlling the video signal and clock signal in a complex manner. For example, the present matrix type display device can display an image based on a video signal with an aspect ratio of 4:3 on the screen with a wider aspect ratio of 16:9, while at the same time, displaying an image based on another video signal in sync with the first-mentioned video signal on a remaining portion of the screen where the image based on the first-mentioned video signal is not displayed. Thus, this arrangement enables the present matrix type display device to readily display a natural image based on a video signal with an aspect ratio of 4:3 without manipulating the same.

It is preferable to arrange the above matrix type display device to be further furnished with a display position switching section for switching positions of the image based on the first video signal and the image based on the second video signal.

According to the above arrangement, when the input first and second video signals are ordinary video signals and two images respectively based on the above two kinds of video signals are displayed concurrently on the screen, the present matrix type display device can readily switch the display positions of the above two images by means of the display position switching section. For example, the display position switching section switches the input of the video signals to the column drivers.

Also, it is preferable to arrange the above matrix type display device to be further furnished with a display ratio changing section for changing a display ratio of the image based on the first video signal and the image based on the second video signal.

According to the above arrangement, the present matrix type display device can display the images respectively based on the first and second video signals by changing a display ratio thereof by means of the display ratio changing section. For example, the display ratio changing section selectively determines which input signal should be inputted to which column driver, and changes the input of the video signals to the column drivers.

Further, it is preferable to arrange the above matrix type display device in such a manner that a plurality of synchronizing video signals of up to N kinds, including at least two kinds of the first and second video signals, are selectively inputted to the N column drivers, respectively, whereby processing of the plurality of video signals is started at a same time and carried out at a same timing.

According to the above arrangement, even when more than two kinds of video signals are inputted, the present matrix type display device can display images respectively based on the above more than two kinds of video signals concurrently on the screen while changing a display ratio among the displayed images by (1) selectively determining which input video signal should be inputted to which column driver, and (2) starting the processing of all the input video signals at the same time and carrying out the processing at the same timing.

Furthermore, it is preferable to arrange the above matrix type display device in such a manner that an arbitrary clock signal is given to each of video signals of up to N kinds including at least two kinds of the first and second video signals, whereby a display amount of each kind of video signal can be changed.

In other words, a plurality of clock signals are prepared and an arbitrary one is given to each kind of video signal, so that the processing of a plurality of video signals of up to N kinds, including at least the first and second video signals, is started at the same time and carried out at the same timing while making it possible to change (adjust) the display range (display area) of each video signal.

This arrangement enables the present matrix type display device to display a video without any omission even when the video has a tall aspect ratio or display a desired region alone. In other words, since each video signal is processed at the timing of their respective clock signals, an optimal clock signal is selectively given to each kind of video signal to obtain a desired display based on the same. This enables the present matrix display device to display an entire video or readily change the display range of each video. For a fuller understanding of the nature and advantages of the invention, reference should be made to the ensuing detailed description taken in conjunction with the accompanying drawings.

BRIEF DESCRIPTION OF THE DRAWINGS

FIG. 2(*a*) is a view explaining a liquid crystal panel, row drivers, and column drivers provided in the above liquid crystal display device;

FIG. 2(*b*) is a view shwoing a pixel in the above liquid crystal display device;

DESCRIPTION OF THE EMBODIMENTS (Embodiment 1)

Referring to FIGS. 1–4, the following description will describe an example embodiment of the present invention.

Figure 2A:
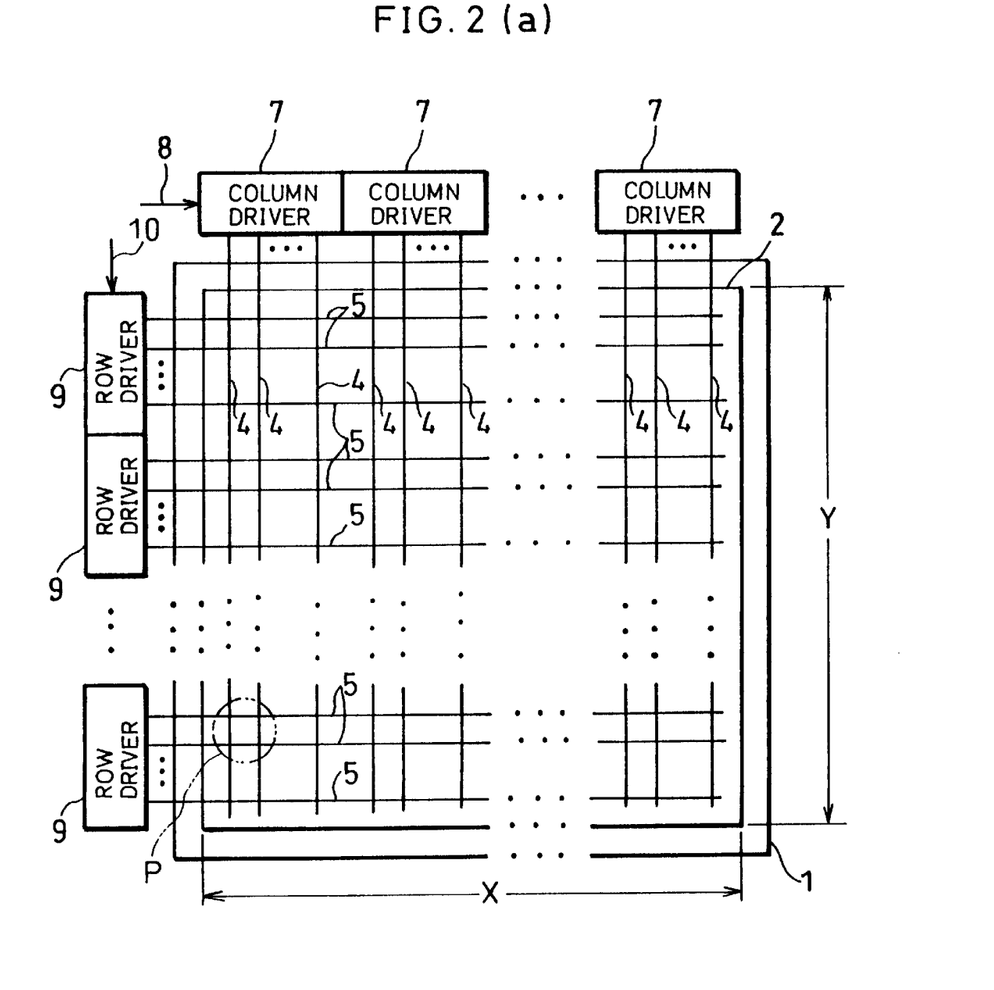
Figure 2B:
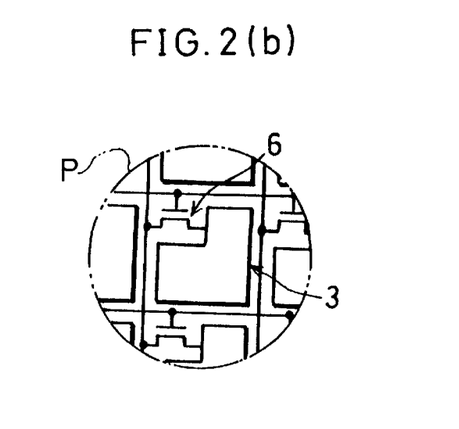
Figure 3:
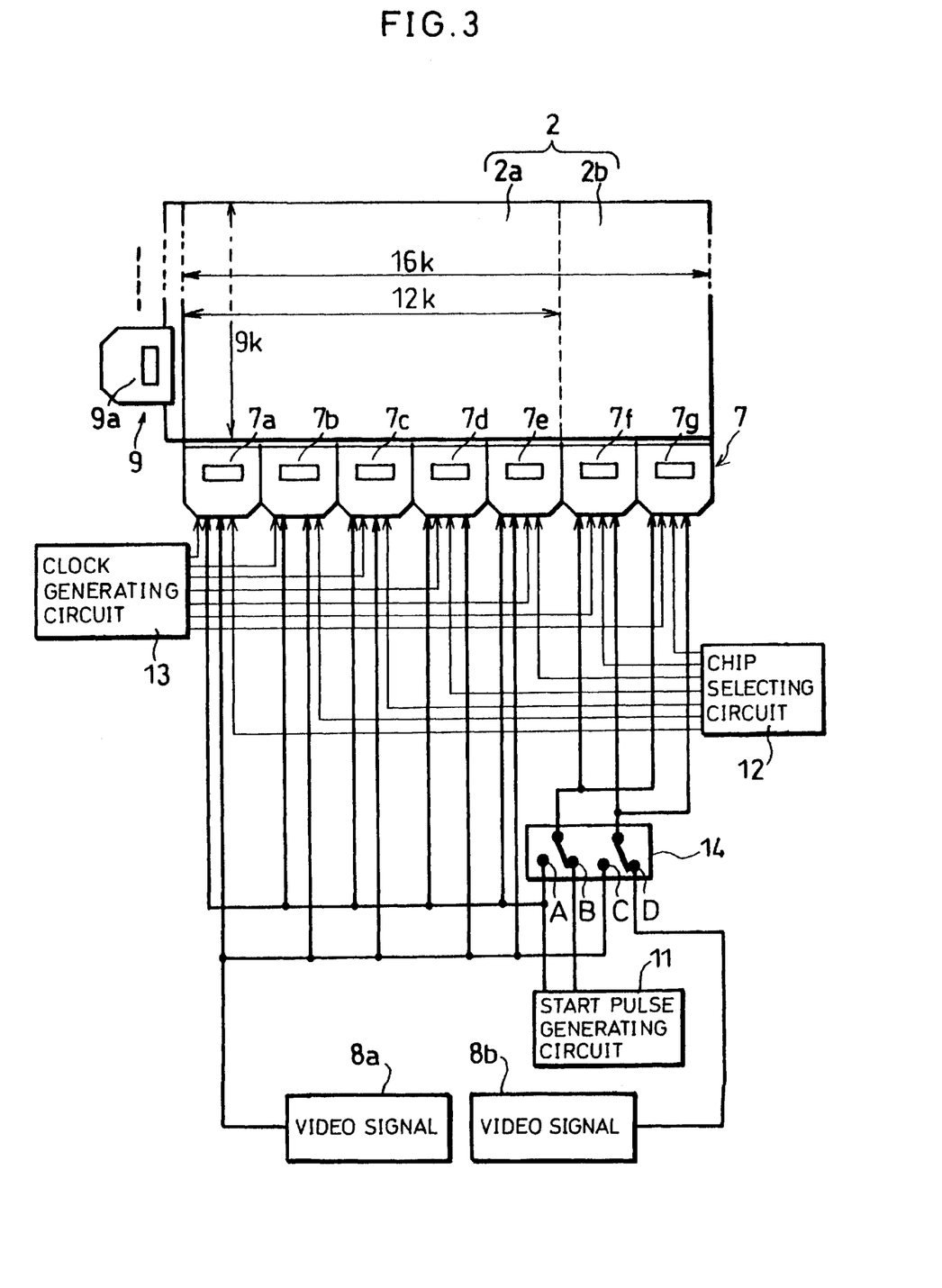
FIG. 3 is a view explaining the input of a video signal, a start pulse signal, a chip selecting signal, a sampling clock signal to each column driver in a liquid crystal display device having a screen with an aspect ratio of 16:9 as an example of the above liquid crystal display device.

A matrix type display device of the present embodiment is an active matrix type liquid crystal display device in which each pixel has a switching element. As is illustrated in FIG. 2(*a*), the present liquid crystal display device includes a liquid crystal panel 1, on which an image based on an input video signal is displayed. The liquid crystal panel 1 includes a pair of substrates and a liquid crystal sandwiched by these substrates. The liquid crystal panel 1 also includes a display unit 2 serving as a screen with an aspect ratio of X:Y, in which a matrix of pixels 3 are aligned. The liquid crystal panel 1 further includes a plurality of parallel column lines 4 and a plurality of parallel row lines 5 in such a manner that the former and the latter intersect at right angles with each other. A switching element 6 is provided to each pixel 3 to supply a signal from the column line 4 by switching back and forth between ON and OFF in response to a signal from the row line 5 (see FIG. 2(*b*) showing an enlarged area 'P' in FIG. 2(*a*)). Arranged in this manner, a voltage is impressed on each pixel 3 in response to the signals from the column line 4 and row line 5, according to which the liquid crystal changes its orientation, thereby displaying an image based on the signal. In other words, incident light on the liquid crystal panel 1 is modulated as the orientation of the liquid crystal varies and an image based on the input video signal is displayed on the display unit 2.

A plurality of column lines 4 are connected to a plurality of column drivers (source drivers) 7, and the number of column lines 4 connected to a single column driver 7 is not especially limited. Each column driver 7 outputs a signal based on a video signal 8 to the connected column lines 4 separately to display an image based on the video signal 8 on the display unit 2. On the other hand, a plurality of row lines 5 are connected to a plurality of row drivers (gate drivers) 9. The number of row lines 5 connected to a single row driver 9 is not especially limited. Each row driver 9 outputs a signal based on an input control signal 10 to the connected row lines 5 separately.

Figure 1:
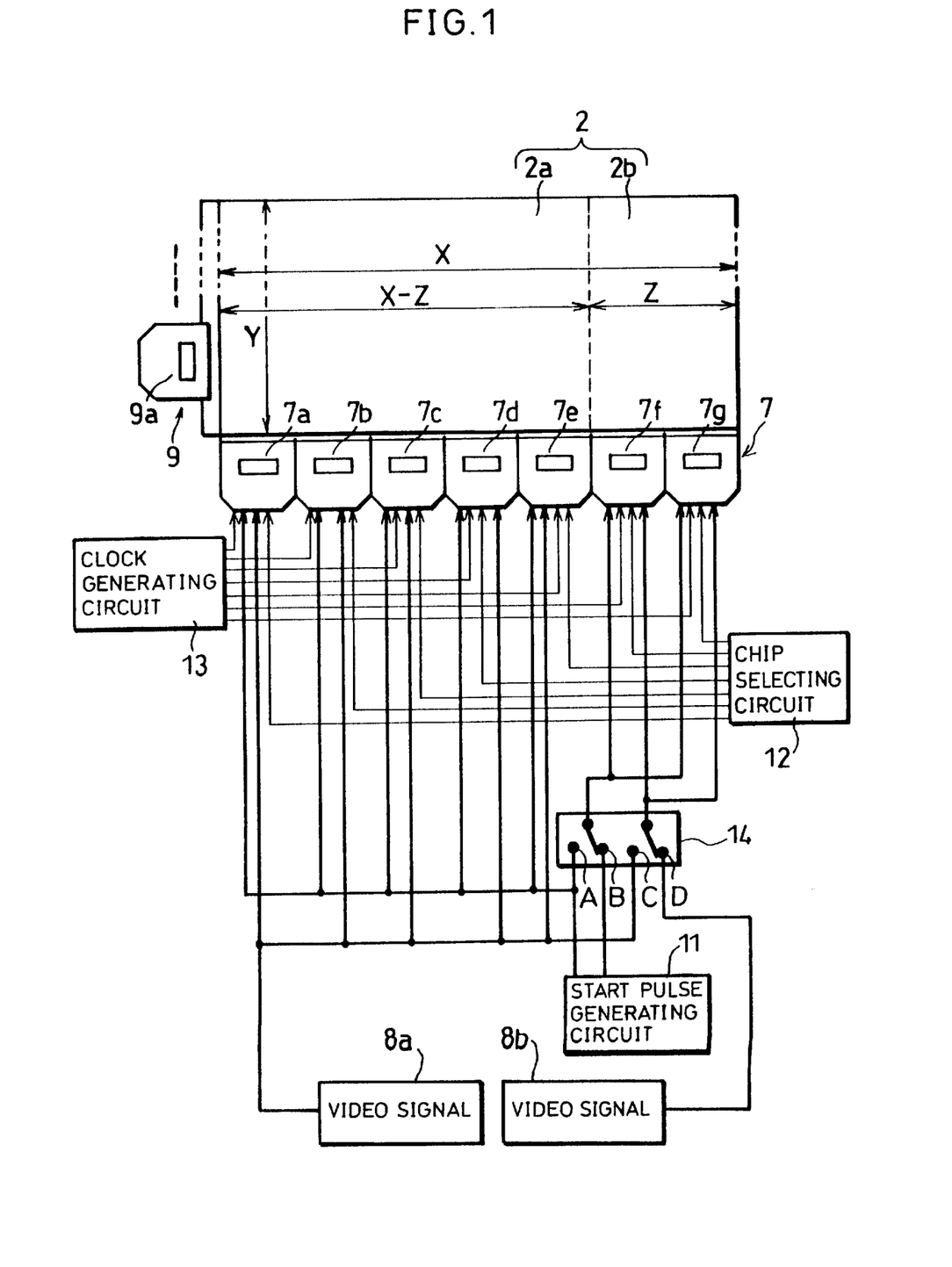
FIG. 1 is a view explaining the input of a video signal, a start pulse signal, a chip selecting signal, and a sampling clock signal to each column driver in a liquid crystal display device in accordance with an example embodiment of the present invention.

FIG. 1 is a view explaining the input of the video signal 8, a start pulse signal, a chip selecting signal, and a sampling clock signal to each column driver 7. As is shown in the drawing, the present liquid crystal display device includes a start pulse generating circuit 11 for column drivers, a chip selecting circuit 12, a clock generating circuit 13, and a switching section 14. Assume that the present liquid crystal display device includes seven column drivers 7a–7g, and the row drivers 9 other than the row driver 9a are omitted in the drawing for the explanation's convenience.

The start pulse generating circuit 11 outputs a start pulse to each of the column drivers 7a–7g to enable the column drivers 7a–7g to start to process the input video signal 8. The start pulse generating circuit 11 has two terminals A and B extended to the switching section 14. The chip selecting circuit 12 assists the column drivers 7a–7g in signal processing. To be more specific, the chip selecting circuit 12 decides which of the column drivers 7a–7g should be selected now and next. The clock generating circuit 13 outputs a sampling clock to each of the column drivers 7a–7g to enable the same to sample the input video signal 8 at the timing of the sampling clock.

Of all the column drivers of 7a–7g, a set of the column drivers 7a–7e correspond to a display section 2a with an aspect ratio of X-Z:Y, while a set of the other column drivers 7f and 7g correspond to a display section 2b with an aspect ratio of Z:Y.

Further, the present liquid crystal display device is arranged to receive two kinds of synchronizing video signals 8a and 8b. In other words, the video signal 8a is inputted into the column drivers 7a–7e individually and the switching section 14 also includes terminals C and D to input the video signal 8a or 8b to a set of the column drivers 7f and 7g individually. To be more specific, when the switch of the switching section 14 is switched to the terminal C, the video signal 8a is inputted into the column drivers 7f and 7g individually, while the switch of the switching section 14 is switched to the terminal D, the video signal 8b is inputted into the column drivers 7f and 7g individually.

In the present liquid crystal display device arranged as above, the switches of the switching section 14 are switched respectively to the terminals A and C to display an image on the screen with an aspect ratio of X:Y based on the input video signal 8a with the same aspect ratio. Upon the switching, the clock generating circuit 13 inputs the sampling clock to the column drivers 7a–7g individually, and at the timing of which the video signal 8a is inputted into the column drivers 7a–7g individually. Subsequently, the column drivers 7a–7g start to process the input video signal 8a sequentially in order of 7a, 7b, . . . , 7g at the timing of the input start pulse. In other words, after one column driver 7 ends the signal processing in order of 7a, 7b, . . . , 7g, the next column driver 7 starts the signal processing in the same order. This arrangement enables the present liquid crystal display device to display a wide image based on the video signal 8a on the display section 2 with an aspect ratio of X:Y.

In contrast, the switches of the switching section 14 are switched respectively to the terminals B and D to display an image based on the video signal 8a with an aspect ratio of X-Z:Y, which is smaller than an aspect ratio of the screen in width (column side). Upon the switching, the clock generating circuit 13 inputs the sampling clock to the column drivers 7a–7g individually, and at the timing of which the synchronizing video signals 8a and 8b are inputted into the set of the column drivers 7a–7e and the set of the column drivers 7f and 7g, respectively. An image displayed based on the video signal 8b referred herein is, for example, a solidly shaded image. Subsequently, at the timing of the input start pulse, the column drivers 7a–7e start to process the video signal 8a sequentially in order of 7a, 7b, . . . , 7e, while at the same time, the column drivers 7f and 7g start to process the video signal 8b sequentially in order of 7f and 7g. In short, the set of the column drivers 7a–7e and the set of the column drivers 7f and 7g start to process the video signals 8a and 8b, respectively at the same time and carries out the processing at the same timing. This arrangement enables the present liquid crystal display device to display two images concurrently: an image based on the video signal 8a on the display section 2a with an aspect ratio of X-Z:Y, and an image based on the video signal 8b, for example, a solidly shaded image, on the other display section 2b with an aspect ratio of Z:Y.

As has been explained, when the video signal 8a with an aspect ratio smaller than an aspect ratio of the display unit 2 is inputted, the present liquid crystal display device can readily display a natural image without manipulating the video signal 8a or controlling the video signal 8a and clock signal in a complex manner. Thus, the present liquid crystal display device, furnished with the display unit 2 of FIG. 3 with a wide aspect ratio of 16:9, can display two images concurrently: an image based on the video signal with an aspect ratio of 4:3 on the display section 2a with the same aspect ratio, and an image based on the other video signal 8b in sync with the video signal 8a, for example, a solidly shaded image, on the remaining portion on the screen, that is, the display section 2b. In short, the present liquid crystal display device can display a natural image based on the video signal 8a with an aspect ratio of 4:3 without manipulating the video signal 8a.

Note that the image displayed based on the video signal 8b is not limited to a solidly shaded image, and the video signal 8b can be an ordinary input video signal as well.

Figure 4:
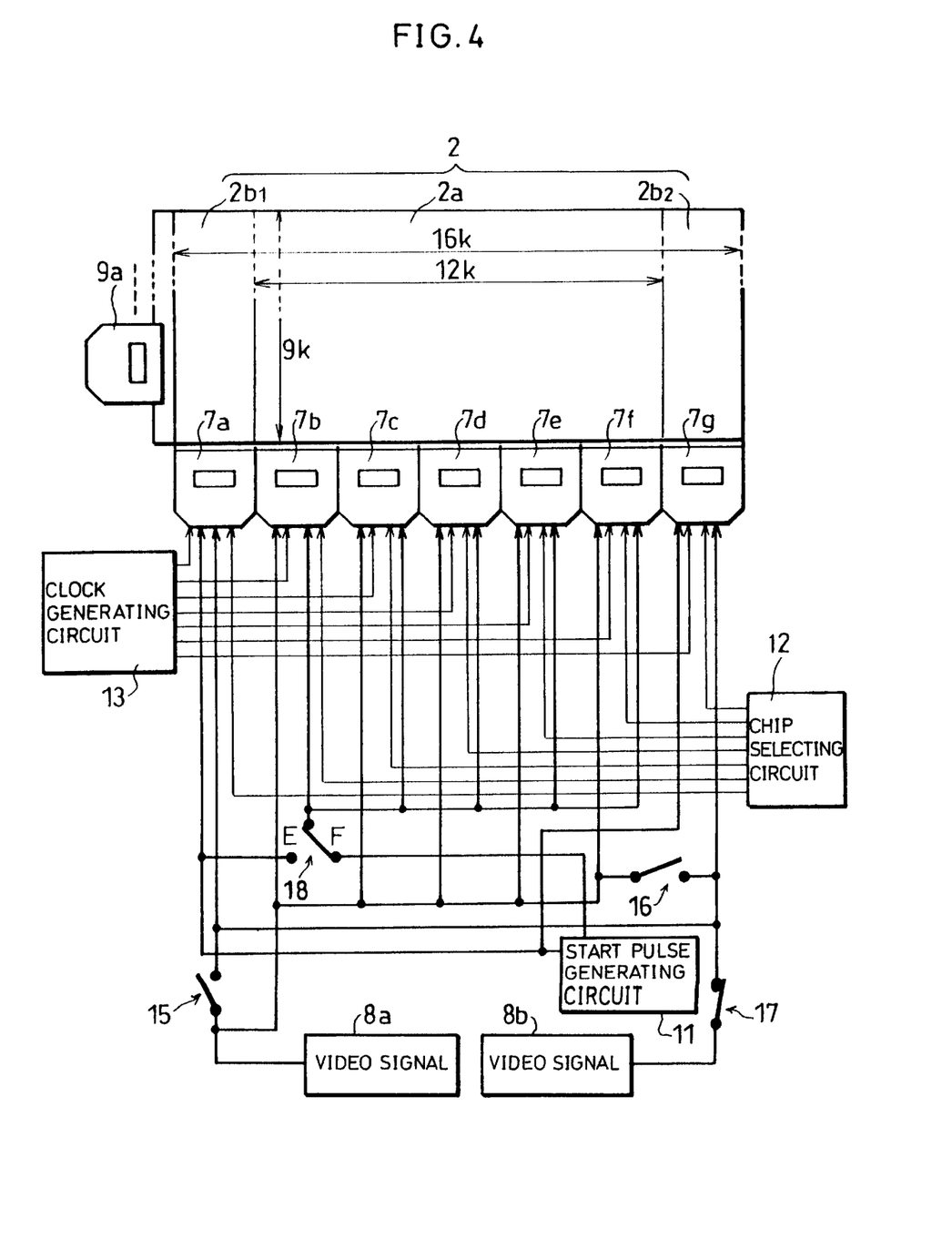
FIG. 4 is a view explaining the input of a video signal, a start pulse signal, a chip selecting signal, and a sampling clock signal to each column driver in a modified example of the above liquid crystal display device.

In addition, if the above liquid crystal display device is modified as is illustrated in FIG. 4, the liquid crystal display device can display an image based on the video signal 8a with an aspect ratio of 4:3 at the center of its screen with an aspect ratio of 16:9. Herein, the video signals 8a and 8b are inputted to the column drivers 7a–7g according to a transmitting pattern shown in the drawing, and the switching section 14 is replaced with four switches 15–18. Also, the display unit 2 with an aspect ratio of 16:9 herein includes the display section 2a with an aspect ratio of 4:3 corresponding to a set of the column drivers 7b–7f at the center, and display sections $2b_1$ and $2b_2$ which correspond to the remaining column drivers 7a and 7g, respectively.

The switches 15 and 16 are turned ON while the switch 17 is turned OFF and the switch 18 is switched to a terminal E to display an image based on the video signal 8a with an aspect ratio of 16:9 on the display unit 2 with the same aspect ratio. Upon the switching, the clock generating circuit 13 inputs the sampling clock to the column drivers 7a–7g individually, at the timing of which the video signal 8a is inputted into the column drivers 7a–7g individually. Subsequently, the column drivers 7a–7g start to process the input video signal 8a sequentially in order of 7a, 7b, . . . , 7g at the timing of the input start pulse. This arrangement enables the present liquid crystal display device to display a wide image based on the video signal 8a on the display unit 2 with an aspect ratio of 16:9.

In contrast, the switches 15 and 16 are turned OFF while the switch 17 is turned ON and the switch 18 is switched to a terminal F to display an image based on the input video signal 8a with an aspect ratio of 4:3 on the display section 2a at the center of the display unit 2. Upon the switching, the clock generating circuit 13 inputs the sampling clock to the column drivers 7a–7g individually, at the timing of which the video signal 8a is inputted to the set of the column drivers 7b–7f and the video signal 8b, which is in sync with the video signal 8a and corresponds to, for example, an solidly shaded image, is inputted into a set of the column drivers 7a and 7g individually. Then, at the timing of the input start pulse, the column drivers 7b–7f start to process the video signal 8a sequentially in order of 7b, 7c, . . . , 7f, and the column drivers 7a and 7g start to process the video signal 8b sequentially in order of 7a and 7g. In short, the set of the column drivers 7b–7f and the set of the column drivers 7a and 7g respectively start to process the video signals 8a and 8b at the same time and carry out the processing at the same timing. This arrangement enables the present liquid crystal display device to display two images concurrently: an image based on the video signal 8a on the display section 2a with an aspect ratio of 4:3 at the center of the display unit 2, and an image based on the video signal 8b, for example, a solidly shaded image, on both the display sections $2b_1$ and $2b_2$ positioned at either side of the display section 2a, respectively.

As has been explained, the present liquid crystal display device modified as is illustrated in FIG. 4 can readily display a natural image based on the input video signal 8a with an aspect ratio of 4:3 at the center of the display unit 2 with a wider aspect ratio of 16:9 without manipulating the video signal 8a and controlling the video signal 8a and clock signal in a complex manner.

(Embodiment 2)

Figure 5:
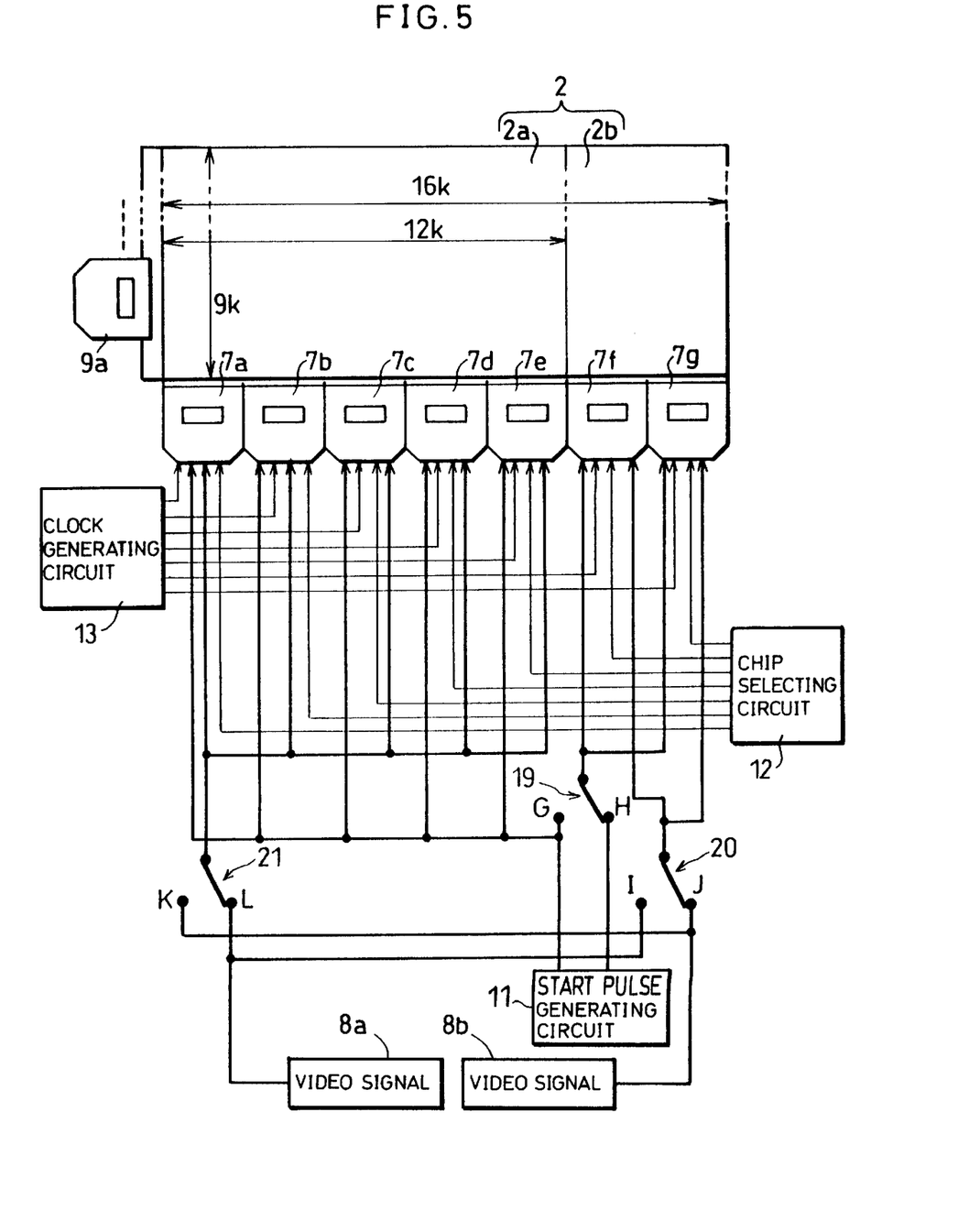
FIG. 5 is a view explaining the input of a video signal, a start pulse signal, a chip selecting signal, and a sampling clock signal to each column driver in a liquid crystal display device in accordance with another example of the present invention.

Referring to FIG. 5, the following description will describe another example embodiment of the present invention. Hereinafter, like components are labeled with like reference numerals with respect to Embodiment 1, and the description of these components is not repeated for the explanation's convenience.

Compared with its counterpart in Embodiment 1, a liquid crystal display device of the present embodiment inputs the video signals 8a and 8b to the column drivers 7a–7g individually in accordance with a transmitting pattern shown in FIG. 5, and the switching section 14 is replaced with three switches 19–21. Herein, the display unit 2 has an aspect ratio of 16:9, and a set of the column drivers 7a–7e correspond to the display section 2a with an aspect ratio of 4:3, while a set of the other column drivers 7f and 7g correspond to the remaining display section 2b.

The switch 19 is switched to a terminal G and the switch 20 is switched to a terminal I while the switch 21 is switched to a terminal L to display an image based on the video signal 8a with an aspect ratio of 16:9 on the display unit 2 with the same aspect ratio. Upon the switching, the clock generating circuit 13 inputs the sampling clock to the column drivers 7a–7g individually, at the timing of which the video signal 8a is inputted into the column drivers 7a–7g individually. Subsequently, the column drivers 7a–7g start to process the video signal 8a sequentially in order of 7a, 7b, . . . , 7g at the timing of the input start pulse. This arrangement enables the present liquid crystal display device to display a wide image based on the video signal 8a on the display unit 2 with an aspect ratio of 16:9.

On the other hand, the switch 19 is switched to the terminal G and the switch 20 is switched to a terminal J while the switch 21 is switched to a terminal K to display an image based on the video signal 8b with an aspect ratio of 16:9 on the display unit 2 with the same aspect ratio. Upon the switching, the clock generating circuit 13 inputs the sampling clock to the column drivers 7a–7g individually, at the timing of which the video signal 8b is inputted into the column drivers 7a–7g individually. Subsequently, the column drivers 7a–7g start to process the video signal 8b sequentially in order of 7a, 7b, . . . , 7g at the timing of the input start pulse. This arrangement enables the present liquid crystal display device to display a wide image based on the video signal 8b on the display unit 2 with an aspect ratio of 16:9.

In contrast, the switch 19 is switched to a terminal H and the switch 20 is switched to the terminal J while the switch 21 is switched to the terminal L to display an image based on the input video signal 8a with an aspect ratio of 4:3 on the display section 2a. Upon the switching, the clock generating circuit 13 inputs the sampling clock to the column drivers 7a–7g individually, at the timing of which the video signal 8a is inputted into the column drivers 7a–7e individually, while at the same time, the video signal 8b, such as an ordinary input video signal in sync with the video signal 8a, is inputted into the column drivers 7f and 7g individually. Then, at the timing of the input start pulse, the column drivers 7a–7e start to process the video signal 8a sequentially in order of 7a, 7b, . . . , 7e, while at the same time, the column drivers 7f and 7g start to process the video signal 8b sequentially in order of 7f and 7g. In short, a set of the column drivers 7a–7e and a set of the column drivers 7f and 7g start to process the video signals 8a and 8b, respectively at the same time and carry out the processing at the same timing. This arrangement enables the present liquid crystal display device to display two images concurrently: an image based on the video signal 8a on the display section 2a with an aspect ratio of 4:3, and an ordinary image based on the video signal 8b on the remaining display section 2b. In other words, the present liquid crystal display device can readily display two images respectively based on the two kinds of input video signals 8a and 8b concurrently on the display sections 2a and 2b of the display unit 2, respectively.

In addition, the switches 20 and 21 can serve as display position switching means, so that the display positions of the displayed images respectively based on the video signals 8a and 8b can be switched. To be more specific, the switch 20 is switched to the terminal I and the switch 21 is switched to the terminal K while the switch 19 is left to the terminal H side to display an image based on the input video signal 8a and an image based on the input video signal 8b on the display sections 2b and 2a of the display unit 2, respectively. Accordingly, the video signal 8b is inputted into the column drivers 7a–7e individually, while at the same time, the video signal 8a is inputted into the column drivers 7f and 7g individually. Then, at the timing of the input start pulse, the column drivers 7a–7e start to process the video signal 8b sequentially in order of 7a, 7b, . . . , 7e, while at the same time, the column drivers 7f and 7g start to process the video signal 8a sequentially in order of 7f and 7g. This arrangement enables the present liquid crystal display device to display an image based on the video signal 8b on the display section 2a with an aspect ratio of 4:3, while displaying an image based on the video signal 8a on the remaining display section 2b.

As has been explained, the liquid crystal display device arranged as above uses the switches 20 and 21 as the display position switching means. Thus, in addition to the effect realized by the counterpart in Embodiment 1, the present liquid crystal display device can readily switch the display positions of the images based on the video signals 8a and 8b, respectively.

(Embodiment 3)

Figure 6:
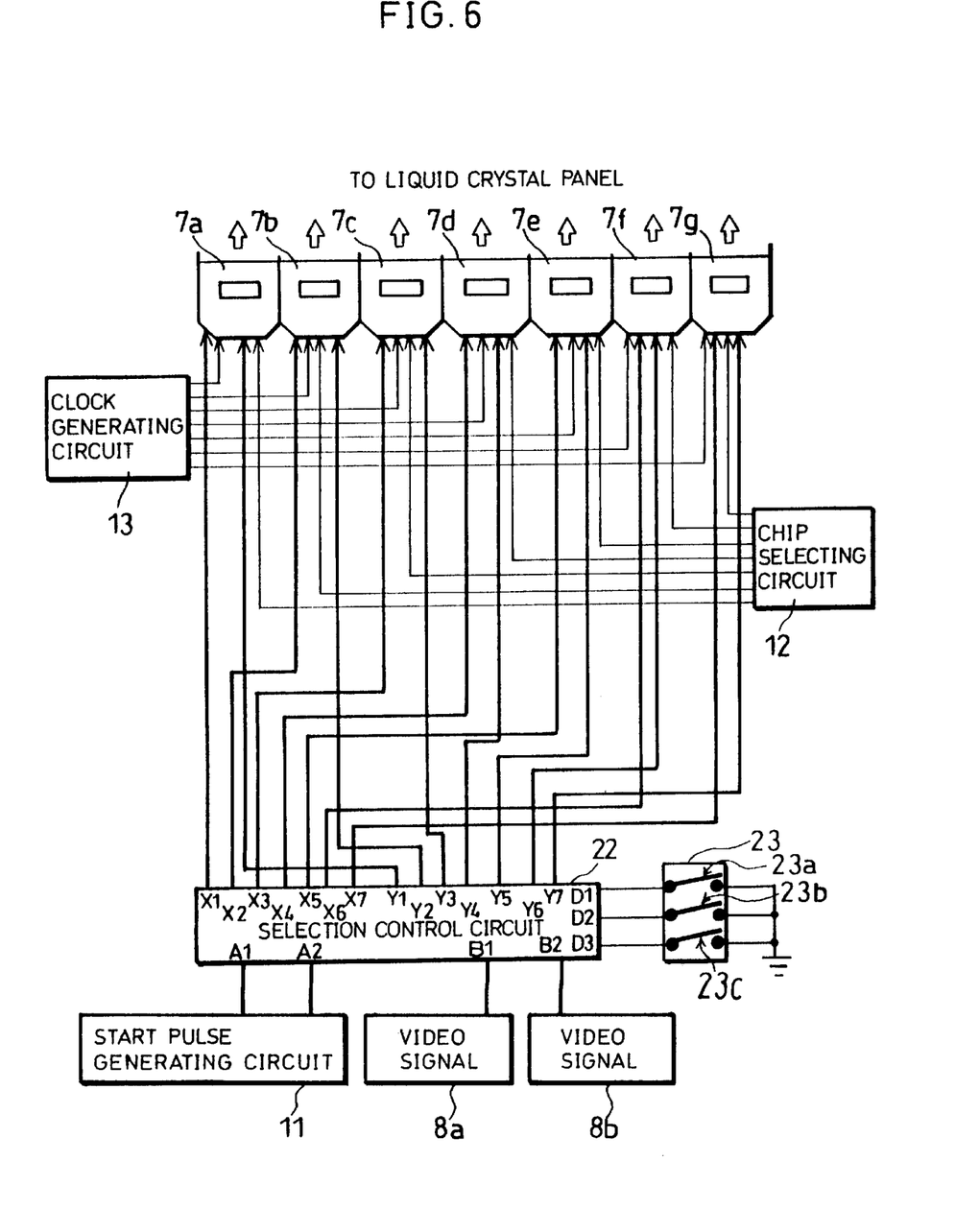
FIG. 6 is a view explaining the input of a video signal, a start pulse signal, a chip selecting signal, and a sampling clock signal to each column driver in a liquid crystal display device in accordance with a further example of the present invention.

Referring to FIG. 6, the following description will describe a further example embodiment of the present invention. Hereinafter, like components are labeled with like reference numerals with respect to Embodiments 1 and 2 and the description of these components is not repeated for the explanation's convenience.

As shown in FIG. 6, a liquid crystal display device of the present embodiment is different from its counterparts in Embodiments 1 and 2 in that a selection control circuit 22 and a switching section 23 are additionally provided. The selection control circuit 22 makes selections as detailed below in response to the ON/OFF state of switches 23a–23c of the switching section 23: (1) based on which input video signals 8 an image should be displayed by selectively determining, of all kinds of input video signals 8, which should be outputted to which column driver 7; and (2) where and at what aspect ratio the image(s) should be displayed. The selection control circuit 22 has four input terminals A1, A2, B1, and B2, fourteen output terminals X1–X7 and Y1–Y7, and three switching terminals D1–D3. The start pulse from the start pulse generating circuit 11 is inputted into the input terminals A1 and A2, while the video signals 8a and 8b are inputted into the input terminals B1 and B2, respectively. The output terminals X1–X7 output the start pulse from the input terminals A1 or A2, while the output terminals Y1–Y7 output the video signals 8a and 8b from the input terminals B1 and B2, respectively.

The present liquid crystal display device arranged as above can select/change an image display ratio based on the two kinds of video signals 8a and 8b in response to the ON/OFF state of the switches 23a–23c of the switching section 23 serving as display ratio changing means.

For example, all the switches 23a–23c are turned OFF to display an image based on the video signal 8a on the display unit 2 with an aspect ratio of 16:9. Under these conditions, the video signal 8a being inputted to the input terminal B1 is selected and further inputted to the column drivers 7a–7g through the output terminals Y1–Y7, respectively. At the same time, the start pulse being inputted to the input terminal A1 is selected and further inputted to the column drivers 7a–7g through the output terminals X1–X7, respectively. This arrangement enables the present liquid crystal display device to display a wide image based on the video signal 8a on the display unit 2 with an aspect ratio of 16:9.

In contrast, the switch 23a alone is turned ON to display an image based on the video signal 8a and an image based on the video signal 8b in a display ratio of 6:1. Under these conditions, the video signal 8a being inputted into the input terminal B1 is selected and further inputted to the column drivers 7a–7f through the output terminals Y1–Y6, respectively. At the same time, the start pulse being inputted to the input terminal A1 is selected and further inputted to the column drivers 7a–7f through the output terminals X1–X6, respectively. On the other hand, the video signal 8b being inputted to the input terminal B2 is selected and further inputted to the column driver 7g through the output terminal Y7. At the same time, the start pulse being inputted to the input terminal A2 is selected and further inputted to the column driver 7g through the output terminal X7. This arrangement enables the present liquid crystal display device to display two images concurrently: an image based on the video signal 8a on the display section corresponding to the set of the column drivers 7a–7f, and an image based on the video signal 8b on the other display section corresponding to the remaining column driver 7g. In short, if each driver 7 is connected to the same number of column lines, the present liquid crystal display device can display an image based on the video signal 8a and an image based on the video signal 8b in a display ratio of 6:1.

Also, the switch 23b alone is turned ON to display an image based on the video signal 8a and an image based on the video signal 8b in a display ratio of 5:2. Under these conditions, the selection control circuit 22 selects/changes the output of the two kinds of input video signals 8a and 8b to the column drivers 7a–7g in an adequate manner. This arrangement enables the present liquid crystal display device to display an image based on the video signal 8a and an image based on the video signal 8b in a display ratio of 5:2. Likewise, the switches 23a and 23b are turned ON to display an image based on the video signal 8a and an image based on the video signal 8b in a display ratio of 4:3. Under these conditions, the selection control circuit 22 selects/changes the output of the two kinds of input video signals 8a and 8b to the column drivers 7a–7g in an adequate manner. This arrangement enables the present liquid crystal display device to display an image based on the video signal 8a and an image based on the video signal 8b in a display ratio of 4:3.

As has been explained, in addition to the effect realized by the counterparts in Embodiments 1 and 2, the present liquid crystal display device can readily display two images respectively based on the synchronizing video signals 8a and 8b concurrently in an arbitrary display ratio by changing the ON/OFF state of the switches 23a–23c.

(Embodiment 4)

Figure 7:
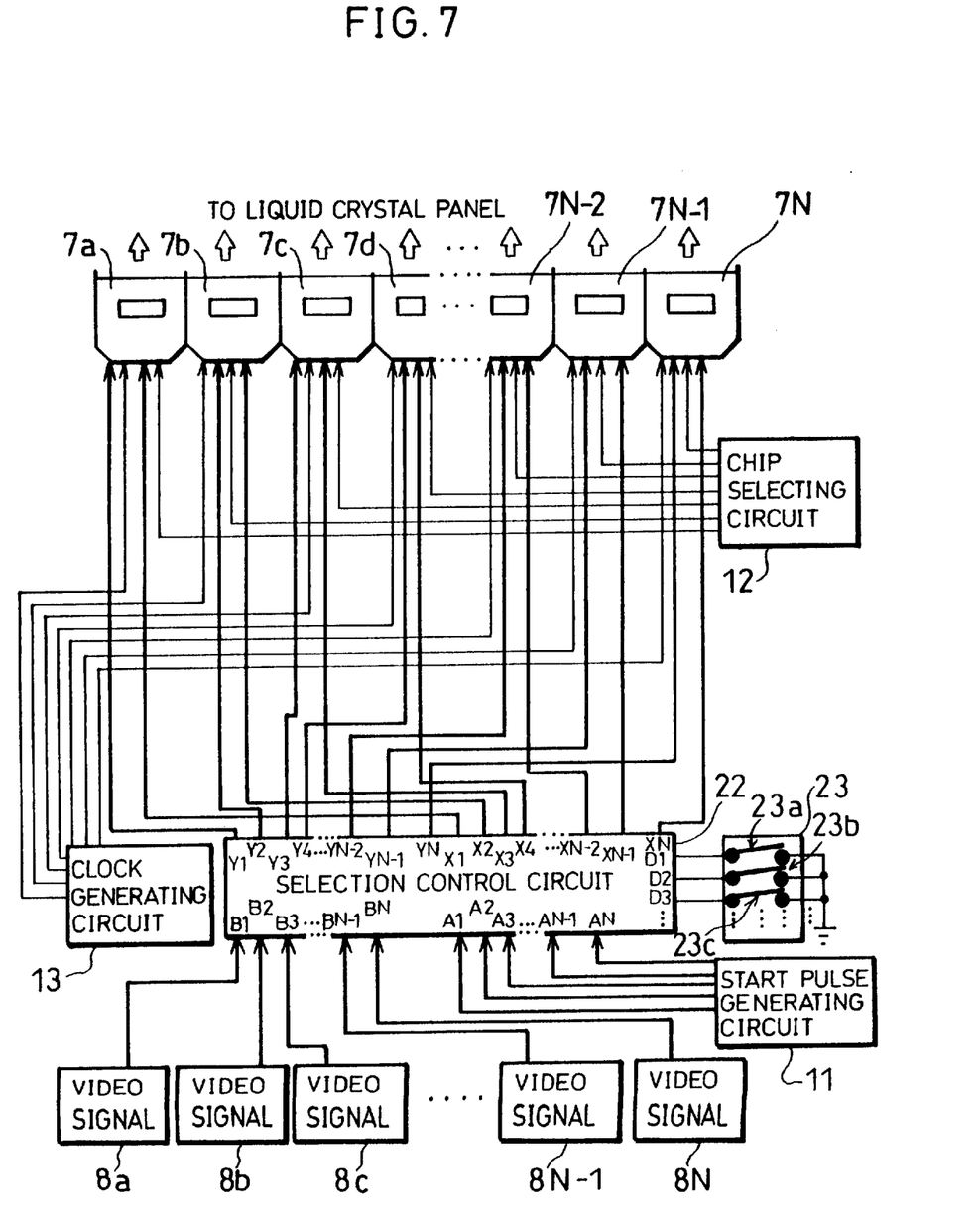
FIG. 7 is a view explaining the input of a video signal, a start pulse signal, a chip selecting signal, and a sampling clock signal to each column driver in a liquid crystal display device in accordance with still another example of the present invention.

Referring to FIG. 7, the following description will describe an example embodiment of the present invention. Hereinafter, like components are labeled with like reference numerals with respect to Embodiments 1–3, and the description of these components is not repeated for the explanation's convenience.

As shown in FIG. 7, a liquid crystal display device of the present embodiment is different from its counterpart in Embodiment 3 in that it includes N column drivers 7a–7N, and the input/output terminals and switching terminals of the selection control circuit 22 and switches of the switching section 23 are increased. To be more specific, the selection control circuit 22 herein includes N input terminals A1–AN for the start pulse generating circuit 11, N input terminals B1–BN for N video signals 8, 2N output terminals X1–XN and Y1–YN for N column drivers 7a–7N. This arrangement enables the present liquid crystal display device to receive up to N kinds of video signals 8a–8N at the N column drivers 7a–7N, respectively. Thus, the present liquid crystal display device can display concurrently N kinds of images based on the synchronizing video signals 8a–8N by inputting the same to the column drivers 7a–7N, respectively.

The switching section 23 has a plurality of switches 23a, 23b, 23c, . . . for the N column drivers 7a–7N. Also, as many switching terminals D1, D2, D3, . . . as the above switches are provided to the selection control circuit 22.

The present liquid crystal display device arranged as above can display up to N kinds of image by inputting the synchronizing video signals 8a–8N to the column drivers 7a–7N, respectively. Moreover, the present liquid crystal display device can display one kind of image on the display unit 2 entirely or display up to N kinds of images in an arbitrary display ratio by selecting/changing the output of the N kinds of video signals to the column drivers 7a–7N by means of the selection control circuit 22.

For example, all the switches 23a, 23b, 23c, . . . are turned OFF to display an image based on the video signal 8a alone on the entire display unit 2. Under these conditions, the video signal 8a being inputted to the input terminal B1 is selected and further inputted to the column drivers 7a–7N through the output terminals Y1–YN, respectively. At the same time, the start pulse being inputted to the input terminal A1 is selected and further inputted to the column drivers 7a–7N through the output terminals X1–XN, respectively. This arrangement enables the present liquid crystal display device to display a wide image based on the video signal 8a alone on the entire display unit 2.

In contrast, the switch 23a alone is turned ON to display an image based on the video signal 8a and an image based on the video signal 8b in the display ratio of N-1:1. Under these conditions, the video signal 8a being inputted to the input terminal B1 is selected and inputted to the column drivers 7a–(7N-1) through the output terminals Y1–(YN-1), respectively. At the same time, the start pulse being inputted to the input terminal A1 is selected and further inputted to the column drivers 7a–(7N-1) through the output terminals X1–(XN-1), respectively. On the other hand, the video signal 8b being inputted to the input terminal B2 is selected and further inputted to the column driver 7N through the output terminal YN, while at the same time, the start pulse being inputted to the input terminal A2 is selected and further inputted to the column driver 7N through the output terminal XN. This arrangement enables the present liquid crystal display device to display two images concurrently: an image based on the video signal 8a on the display section corresponding to the column driver 7a–(7N-1) and an image based on the video signal 8b on the remaining display section corresponding to the column driver 7N. In short, the present liquid crystal display device can display an image based on the video signal 8a and an image based on the video signal 8b in a display ratio of N-1:1.

Likewise, the switches 23a, 23b, 23c, . . . are turned ON/OFF when more than two kinds of video signals 8 are inputted. According to the switching manipulation, to which of the column drivers 7a–7N each kind of video signal 8 should be inputted is selected, so that the column drivers 7a–7N start to process the video signals 8 at the same time and carry out the processing at the same timing. This arrangement enables the present liquid crystal display device to display images based on more than two kinds of video signals concurrently in an arbitrary display ratio.

As has been explained, in addition to the effect realized by the counterpart in Embodiment 3, the present liquid crystal display device arranged as above can display up to N kinds of images concurrently by inputting synchronizing video signals 8a–8N to the column drivers 7a–7N, respectively. Also, the present liquid crystal display device can display an image based on one kind of video signal 8 on the entire screen, or display up to N kinds of images concurrently in an arbitrary display ratio by changing the ON/OFF state of the switches 23a, 23b, 23c . . . of the switching section 23.
(Embodiment 5)

Figure 8:
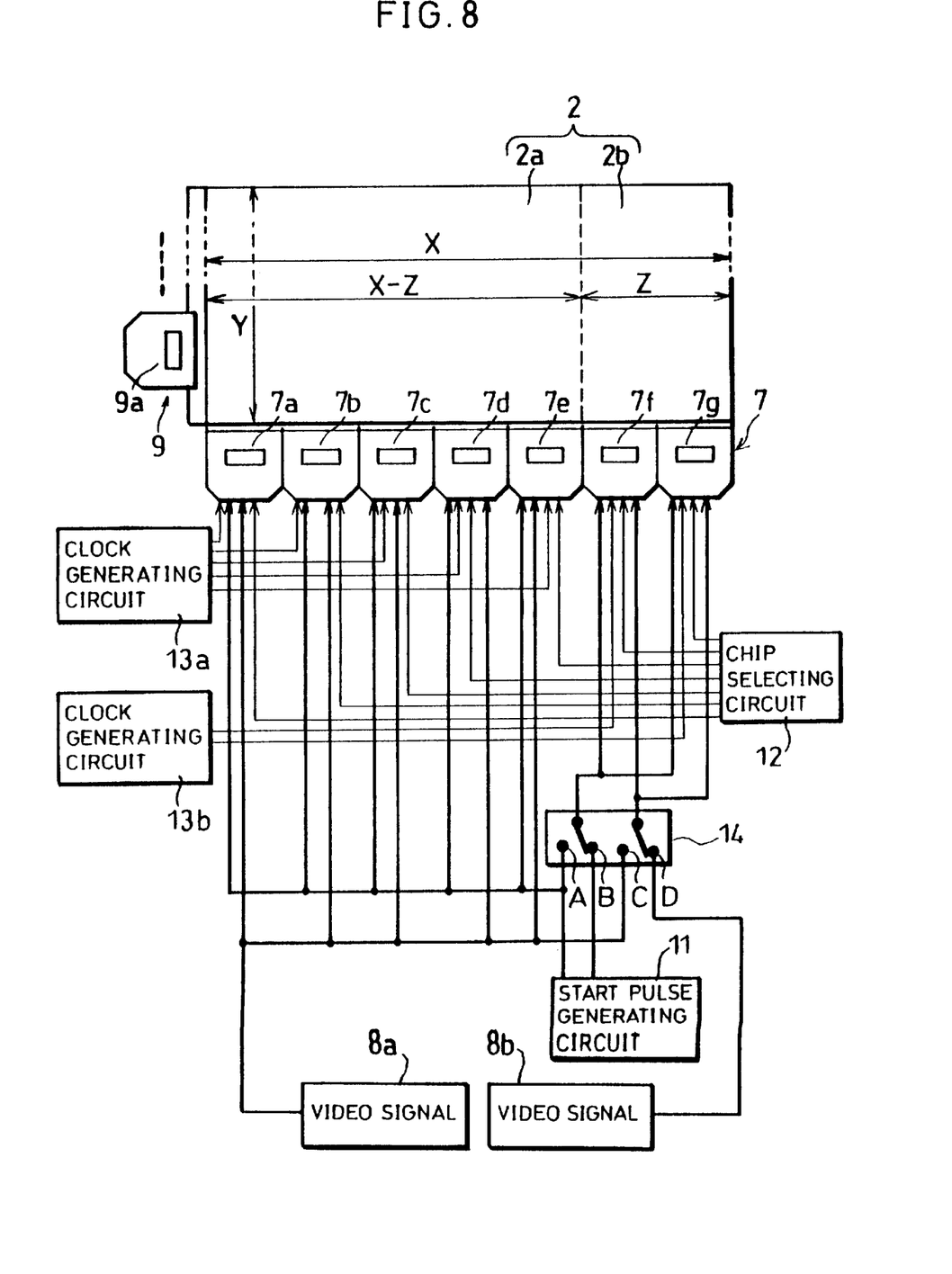
FIG. 8 is a view explaining the input of a video signal, a start pulse signal, a chip selecting signal, and a sampling clock signal to each column driver in a liquid crystal display device in accordance with still another example of the present invention.

Referring to FIG. 8, the following description will describe an example embodiment of the present invention. Hereinafter, like components are labeled with like reference numerals with respect to Embodiments 1–4, and the description of these components is not repeated for the explanation's convenience.

As is shown in FIG. 8, like its counterpart in Embodiment 1, a liquid crystal display device of the present embodiment includes seven column drivers 7a–7g (FIG. 8 shows a modified example of FIG. 1 of Embodiment 1, and in case of N column drivers, the same are referred to as 7a–7N). However, the present liquid crystal display device is different from its counterpart in Embodiment 1 in that the clock generating circuit 13 is replaced with two kinds of clock generating circuits 13a and 13b.

Each of the clock generating circuits 13a and 13b generates their respective sampling clocks having different timing. Herein, the sampling clock from the clock generating circuit 13a is selected as the output to the column drivers 7a–7e, while the sampling clock from the other clock generating circuit 13b is selected as the output to the column drivers 7f and 7g. Therefore, videos respectively entering into the display sections 2a and 2b herein are processed respectively at the timing of the sampling clocks from the clock generating circuits 13a and 13b before they are displayed on the display sections 2a and 2b, respectively. Thus, as soon as the video signal 8a is inputted to the column drivers 7a–7e and the video signal 8b is inputted to the column drivers 7f and 7g, the video signal 8a is processed at the timing of the sampling clock from the clock generating circuit 13a, while the video signal 8b is processed at the timing of the sampling clock from the clock generating circuit 13b before they are displayed in the form of separate videos on their respective display sections 2a and 2b.

Incidentally, the example liquid crystal display device in Embodiment 1 can not display an entire video based on the video signal 8b with a tall aspect ratio on the display section 2b.

To solve the above problem, the liquid crystal display device of the present embodiment is arranged to enable, for example, the column drivers 7f and 7g to start to process the input video signal 8b at the timing of a sampling clock from the other clock generating circuit 13b. Thus, to display an entire video based on the video signal 8b on the display section 2b, the clock generating circuit 13b is adjusted to output a sampling clock at adequate timing. Moreover, adjusting a sampling clock from the clock generating circuit 13b makes it possible to display only a desired range of the video.

The same is done to display a video with a tall aspect ratio on the display section 2a. That is to say, adjusting a sampling clock from the clock generating circuit 13a makes it possible to display only a desired range of the video.

In addition, the liquid crystal display devices in Embodiments 2–4 can be modified in the same manner as the present liquid crystal display device. In other words, a range of a displayed video can be readily changed by supplying a sampling clock from different clock generating circuit to each kind of video signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A matrix type display device capable of receiving more than one video signal, comprising:

N (N>2) column drivers, said each column driver being connected to a plurality of column lines, said each column driver outputting a signal based on an input video signal to said connected column lines separately to display an image based on said video signal on a screen; and a plurality of row drivers, said each row driver being connected to a plurality of row lines to output a signal to said connected row lines separately, wherein 2 to N kinds of video signals are inputted selectively to any of said N column drivers, and when a first video signal among said video signals has a smaller aspect ratio than an aspect ratio of said screen in width, a second video signal among said video signals is inputted to at least some of said column drivers which correspond to a remaining portion on said screen where an image based on said first video signal is not displayed.

2. The matrix type display device as defined in claim 1 further comprising display position switching means for switching positions of the image based on said first video signal and the image based on said second video signal.

3. The matrix type display device as defined in claim 1 further comprising display ratio changing means for changing a display ratio of the image based on said first video signal and the image based on said second video signal.

4. The matrix type display device as defined in claim 1, wherein an arbitrary clock signal is given to each of video signals of up to N kinds including at least two kinds of said first and second video signals, whereby a display amount of said each kind of video signal can be changed.

5. The matrix type display device as defined in claim 1, wherein said screen has an aspect ratio of 16:9 and said first video signal has an aspect ratio of 4:3.

6. The matrix type display device as defined in claim 1, wherein the image displayed based on said second video signal is a solidly shaded image.

7. The matrix type display device as defined in claim 1, wherein the image based on said first video signal is displayed at a center of said screen.

8. The matrix type display device as defined in claim 1, wherein said matrix type display device is an active matrix type liquid crystal display device, in which each pixel has a switching element.

9. The matrix type display device as defined in claim 1, wherein said second video signal is inputted into any of said column drivers so as to be processed at a same start and at a same timing with respect to said first video signal.

10. A display device comprising:

a display panel having a plurality of pixel elements connected to row lines and column lines;

column drivers each of which is connected to a respective group of said column lines; and a display control circuit which is operable so that when a first video signal is input to a set of less than all of said column drivers, a second different video signal is input to at least some of the remaining column drivers.

11. The display device as defined in claim 10, wherein said display panel has an aspect ratio of X:Y and said display control circuit is operable so that when the first video signal is input to a set of column drivers corresponding to a first section of said display panel having an aspect ratio of X-Z:Y, the second video signal is input to a set of column drivers corresponding to a second section of said display panel having an aspect ratio of Z:Y.

12. The display device as defined in claim 10, wherein said display panel has an aspect ratio of X:Y and said display control circuit is operable so that when the first video signal is input to a set of column drivers corresponding to a first section of said display panel having an aspect ratio of X-Z:Y, the second video signal is input to column drivers corresponding to sections of said display panel on each side of said first section.

13. The display device as defined in claim 10, wherein said display control circuit is further operable so that the sets of column drivers to which the first and second video signals are input is variable.

14. The display device as defined in claim 10, wherein said display control circuit is further operable so that the first video signal is input to all of said column drivers.

15. The display device as defined in claim 10, further comprising:

a clock generating circuit for supplying sampling clocks of the same timing to all of said column drivers.

16. The display device as defined in claim 10, further comprising:

a first clock generating circuit for supplying sampling clocks of a first timing to the set of column drivers to which the first video signal is supplied; and a second clock generating circuit for supplying sampling clocks of a second different timing to the column drivers to which the second video signal is supplied.

17. The display device as defined in claim 10, further comprising:

row drivers each of which is connected to a respective group of said row lines.

18. A display device comprising:

a display panel having a plurality of pixel elements connected to row lines and column lines;

column drivers each of which is connected to a respective group of said column lines; and a display control circuit, said display control circuit being configured to supply a video signal of a first format to all of said column drivers in order to display the video signal of the first format with a first aspect ratio, and said display control circuit being configured to supply a video signal of a second format to a set of less than all of said column drivers and to supply a video signal different than the video signal of the second format to at least some of the remaining column drivers in order to display the video signal of the second format with a second aspect ratio.

19. The display device as defined in claim 18, wherein the different video signal provides a solidly shaded image.

20. The display device as defined in claim 18, wherein the first aspect ratio is 16:9 and the second aspect ratio is 4:3.

21. The display device as defined in claim 18, wherein the display panel is a liquid crystal display panel.

22. A display device comprising:

a display panel having a plurality of pixel elements connected to row lines and column lines;

column drivers each of which is connected to a respective group of said column lines; and a display control circuit, said display control circuit being configured to supply a video signal of a first format to a first set of less than all of said column drivers in order to display the video signal of the first format at a first position on said display panel or to supply the video signal of the first format to a second different set of less than all of said column drivers in order to display the video signal of the first format at a second different position on said display panel.

23. The display device as defined in claim 22, wherein the display panel is a liquid crystal display panel.

* * * * *